United States Patent Office 3,562,987
Patented Feb. 16, 1971

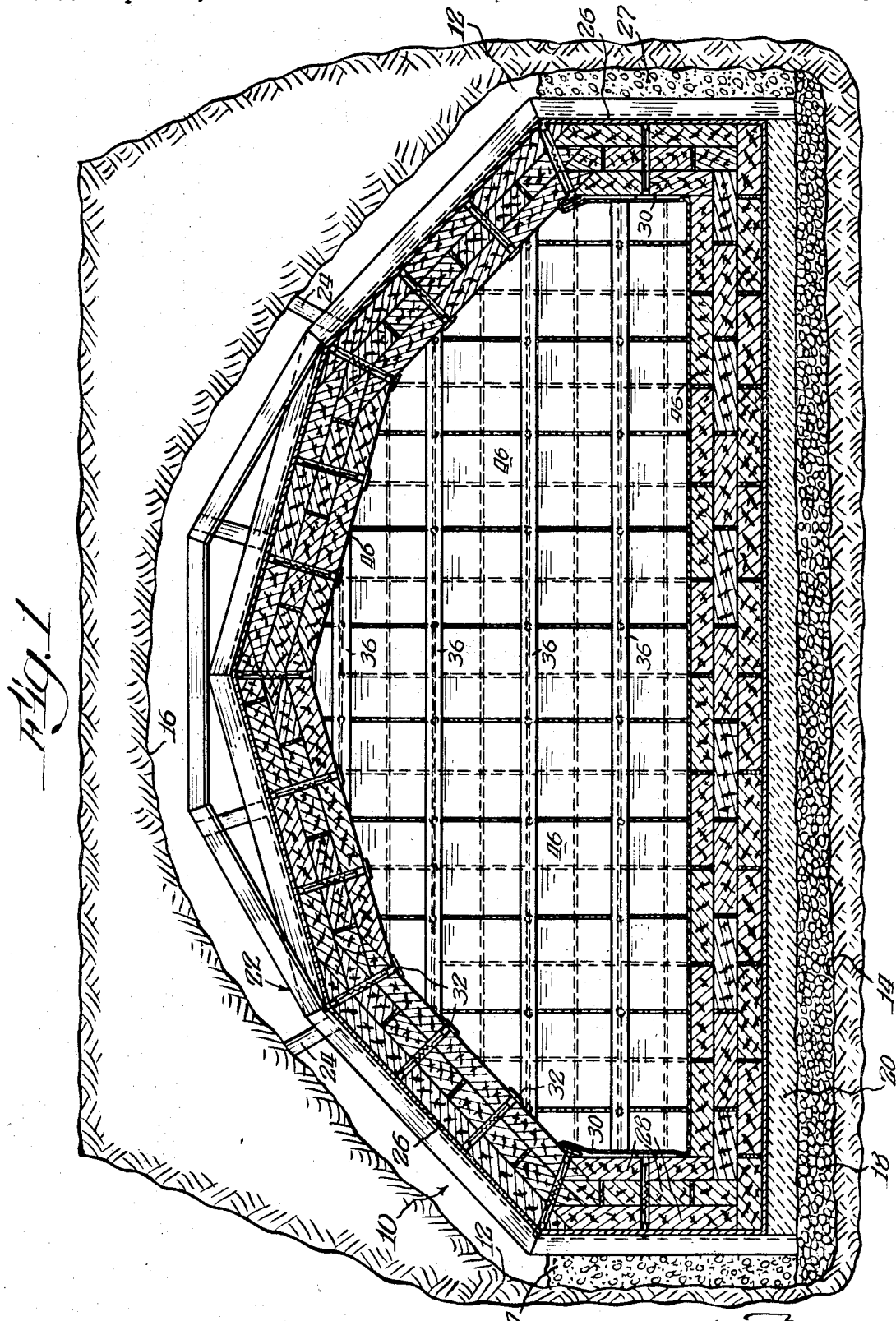

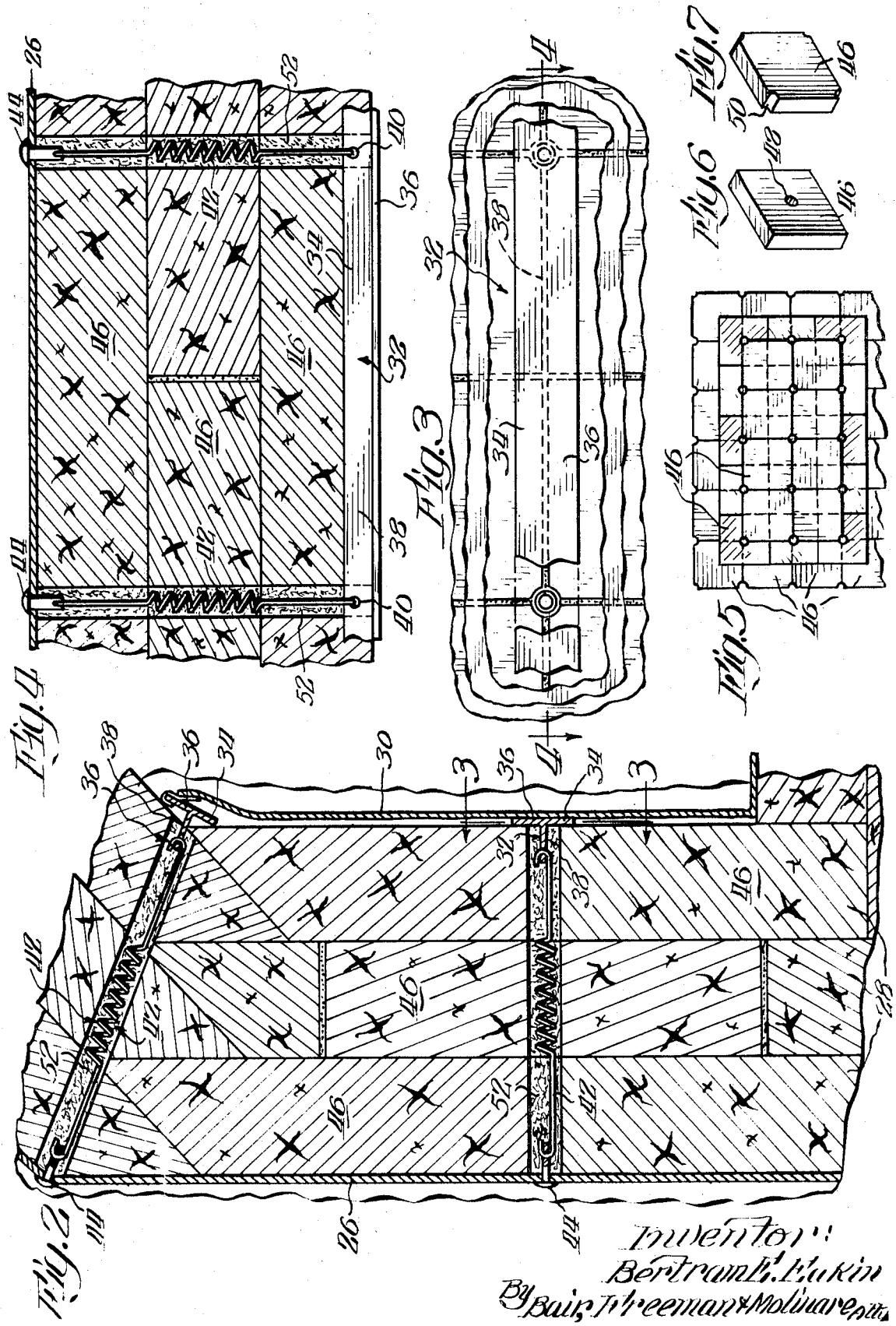

3,562,987
SECURING STRUCTURE FOR
INSULATING PANELS
Bertram E. Eakin, Naperville, Ill., assignor to Institute
of Gas Technology, a non-profit corporation of Illinois
Filed Sept. 20, 1968, Ser. No. 761,180
Int. Cl. E04b 1/38; E04c 1/40
U.S. Cl. 52—269                                    5 Claims

ABSTRACT OF THE DISCLOSURE

Structure for securing a plurality of insulating panels to a surface, such as a wall. A plurality of insulating panels are mounted against the structure. On the side of the insulating panels that is opposite to the side against which the panels are mounted, a rigid elongated member is provided. Springs are provided for interconnecting the rigid member to the wall-like structure, whereby the springs firmly, but resiliently, pull the rigid members against the insulating panels for securing them in place against the wall-like structure.

BACKGROUND OF THE INVENTION

Field of the invention and description of the prior art

This invention relates to structure for securing insulating panels in place, and it particularly relates to structure for securing a plurality of insulating panels in place in a chamber for storing liquefied gas at atmospheric pressure and at cryogenic temperatures.

Gas utility companies encounter significant problems during particularly cold days during the heating season because of the great demand made on the supply of the gas available for heating. As a result of this great demand on the available supply, it is generally necessary for gas utility companies to provide storage chambers for large quantities of heating gas so that the gas will be available during the peak demand days. Because an extremely large volume of storage space is required for storing the natural gas while it is in the gaseous state, it is preferred that the gas be stored in a liquefied condition. Gas is generally stored in a liquefied condition either by maintaining the gas at high pressures or at substantially atmospheric pressure and cryogenic temperatures. The system of this invention is related to the latter storage method.

One such chamber for storing liquefied gases at cryogenic temperatures is shown and described in U.S. patent application Ser. No. 527,158, filed Feb. 14, 1966, now U.S. Pat. No. 4,407,606. In the securing method disclosed in the said patent, the individual insulating panels, such as foamed polyurethane, are secured together by means of a suitable adhesive.

In order to overcome certain problems encountered, the storage system disclosed in U.S. patent application Ser. No. 702,471, filed Feb. 1, 1968 and now abandoned, was devised. Specifically, in this storage chamber for liquefied gases at cryogenic temperatures, the water barrier comprises a rigid metal plate and a special porous concrete, commonly known as "popcorn" concrete, is poured into the space between the chamber wall and the metal water barrier. The foamed insulating panels are also secured to the metal water barrier by adhesive and to each other by adhesive. A vapor barrier is located on the inner side of the insulating panels, preferably along the lower portion of the insulation panels so as to prevent the passage of the liquid gas from the chamber and from contacting the foam insulating panels.

In both of the above described liquid gas storage systems, there are problems encountered when using adhesives.. The adhesives are applied at relatively normal temperatures, but are subjected to consistently low, cryogenic temperatures, which condition may adversely affect the holding strength of the adhesives. Also, the weight of the liquid in the chamber may have an adverse effect on the holding power of the adhesive. Furthermore, moisture that comes into contact with the insulating panels may adversely affect the holding power of the adhesive. As a result, it is preferred that supporting structure be provided for positively holding the insulating panels in place in the gas storage chamber, rather than merely using adhesives.

Structure for holding insulating panels in place in cryogenic storage tanks for gas is shown in the Smith et al. Pat. No. 3,196,622. In this structure, a series of rigid, vertically spaced, horizontal bands are located around the inside surface of the insulating panels in the storage tank. The bands are secured together by structure which includes a spring attaching structure. The bands are secured together by structure which includes a spring attaching structure. The bands are secured to and spaced apart by means of upright members which are connected to the floor and walls of the chamber. The securing system shown in this patent is clearly rather complex and significant problems are encountered in the installation thereof. The structure is also quite expensive, not only from the standpoint of installation costs, but also a relatively large number of parts of special construction are required.

SUMMARY OF THE INVENTION

It is therefore an important object of this invention to provide improved structure for securing panels, such as insulating panels, positively in place particularly in a chamber for storing liquefied gases at cryogenic temperatures.

It is also an object of this invention to provide an improved structural system for securing insulating panels in place to a rigid planar structure wherein the securing structure is particularly characterized by its economy and simplicity in construction, manufacture, and installation.

It is a further object of this invention to provide an improved structure for securing insulating panels in place in a chamber for storing liquefied gases at cryogenic temperatures wherein the securing structure floats with the insulating panels during any expanding or contracting movement.

It is yet another object of this invention to provide an improved system for securing panels in place in a chamber for storing liquefied gases at cryogenic temperatures wherein the insulating panels are positively held in place against a rigid planar structure by use of a plurality of rigid support members which are secured to the planar structure by resilient means, such as springs.

Further purposes and objects of this invention will appear as the specification proceeds.

The foregoing objects are accomplished by providing, in combination, an outer planar structure, insulating panels mounted adjacent the planar structure, rigid support members engaging the inner face of the insulating panels, and resilient means for joining the rigid planar structure to the support means for positively supporting the insulating panels between the outer planar structure and the support means.

BRIEF DESCRIPTION OF THE DRAWINGS

FIG. 1 is a cross-sectional view through a chamber for storing liquefied gas at cryogenic temperatures wherein the chamber utilizes the insulation securing means of my invention;

FIG. 2 is an enlarged cross-sectional view showing my improved support structure in the environment of the embodiment of FIG. 1;

FIG. 3 is a cross-sectional view taken along the line 3—3 of FIG. 2;

FIG. 4 is a cross-sectional view, taken along the line 4—4 of FIG. 3, also showing my improved supporting structure;

FIG. 5 is a schematic view showing the manner of staggering the insulating panels relative to the support structure;

FIG. 6 is a perspective view of an insulating panel having an aperture therein for passage of a spring member therethrough; and FIG. 7 is a perspective view of another insulating panel wherein the spring means passes through a corner thereof.

DESCRIPTION OF THE PREFERRED EMBODIMENT

Referring to FIG. 1, there is shown a chamber 10 for storing liquefied natural gases at cryogenic temperatures. Although the chamber 10 is shown as being formed as an underground chamber, it is to be understood that the present invention is uesful in various types aof insulated storage chambers, including chambers or storage tanks entirely above the ground, entirely below the ground, or partially above and partially below the ground.

The storage chamber 10, in the embodiment shown in FIG. 1, is formed completely below the ground and is defined by side walls 12, a floor 14, and a top 16. Preferably, the chamber defining formation surrounding the chamber 10 is substantially a rock formation so as to provide natural supporting strength for the chamber structure. To provide for drainage of water around the chamber, the natural rock floor 14 has a layer of gravel 18 or similar porous, water transmitting material positioned thereon. A rigid concrete slab 20 is located over the gravel layer 18 to thereby transmit load bearing support for the liquefied gas within the chamber 10 to the rock floor 14.

A rigid supporting frame, generally 22, is fixedly secured by suitable means to the side walls 12 and top 16 of the chamber 10. The frame 22 includes mounting members 24 which are secured to the walls 12 and top 16. A continuous planar metallic liner 26 is rigidly secured to the support frame 22. The liner 26 acts as a water barrier to prevent the ingress of water from the space around the chamber 10 into the chamber 10 to prevent intermixing of the stored liquid gas and the surrounding ground water.

Between the side walls 12 and the metal line 26, porous concrete 27, such as "popcorn concrete" is positioned. This porous concrete transmits the hydraulic load from sides of the chamber 10 to the supporting walls 12 and the porous concrete also transmits water from around the cavern or chamber 10 to the gravel 18 where the water is ultimately drained into a sump (not shown) and a pump (not shown) pumps the water from the sump.

Multiple layers of block insulating foam 28, preferably foam polyurethane, are located on the inner side of the metallic liner 26. The insulating layers 28 maintain the liquefied natural gas at the necessary low cryogenic temperatures. At least the lower portion of the inside of the insulating layers 28 in the chamber 10 is covered by a liquid and vapor barrier 30. The liquid barrier 30 is desirably a metallic liner or a lamination of plastic film and metal. The purpose of the liquid barrier 30 is to prevent the egress of the liquid natural gas from within the chamber through the insulation 28 surrounding the chamber. Although the liquid and vapor barrier 30 may completely cover the inner surface of the insulation 28, generally it only needs to be in contact with the liquid gas and therefore only needs to cover the lower portion of the chamber 10.

Structure, generally 32, provided for supporting the insulating layers 28 in place firmly and positively against the metal liner 26 is the important feature involved in the invention. A plurality of these supporting structures 32 are mounted along the innermost surface of the innermost insulating layer 28 and are connected at their opposite ends to the rigid metal liner 26. The details of the supporting structures 32 are shown most clearly in FIGS. 2–4.

Each of the plurality of supporting structures 32 includes an elongated rigid member, generally 34. The elongated members 34 are T-shaped in cross-section, as best shown in FIG. 2. Each T-shaped elongated member 34 is comprised of a planar restraining portion 36 which engages the innermost surface of the innermost insulating layer 28. An outwardly projecting portion 38 extends centrally of the restraining portion 36 and is unitary therewith.

As best shown in FIG. 4, a plurality of apertures 40 are positioned at spaced intervals in the projecting portions 38 of the elongated members 34. The spacing of the apertures 40 is approximately equivalent to the width of the individual insulating panels 46 in each insulating layer 28.

Tension springs 42 engage, at one end, the apertures 40 of the projecting portions 38. The opposite end of each tension spring 42 is received by suitable rigid means, such as a rivet 44 having an aperture therein, the rivets 44 being securely connected to the rigid planar liquid barrier 26.

It is thus seen that the tension springs 42 positively pull the supporting structures 32 firmly against the innermost surface of the panels 46 of the insulating layers 28. The insulating layers 28 are thereby sandwiched between the supporting structures 32 and the rigid member 26. The elongated members 34 are positioned interior of the outer liner 30, that is, between the liner 30 and the innermost insulating layer 28, as best shown in FIG. 2.

Preferably, the panels 46 in adjacent insulating layers 28 are staggered relative to each other, in the manner generally shown in FIG. 5, so that the corners of the insulating panels 46 of one layer are aligned with the central portions of the individual panels 46 of the adjacent insulating layer 28. Since the spacing of the apertures 40 in the projecting portions 38 of the elongated members 34 is approximately equal to the width of the panels 46, the panels in one layer have apertures 48 in their central portions, as shown in FIG. 6, while the insulating panels 46 of adjacent layers 28 have 90° cylindrical sections provided in the corners thereof, as best shown in FIG. 7.

When the panels 46 are placed in layers in the manner shown in FIG. 5, the central apertures 48 are placed in alignment with apertures defined by four cylindrical sections 50 of four panels. The springs 42 pass through the apertures 48 or the apertures defined by the cylindrical sections 50, to thereby positively pull the supporting structures 32 firmly against the insulating panels 46.

Preferably, the space defined by the apertures 48 and the cylindrical sections 50 is filled with insulating material 52, such as a suitable insulating foam, in order to substantially prevent heat transfer from the exterior ground through the openings and into the storage chamber. By the use of the insulating material 52, the amount of heat transfer is directly related to the diameter of the wire used for the tension springs 42. In the described structure, the heat transfer through the springs 42 is substantially nil.

In the foregoing description, it is seen that I have provided a highly simple yet effective structure for supporting insulating panels in place in a chamber for storing liquid gases at cryogenic temperatures. The system uses positive force to pull the panels in place against the rigid water barrier 26. The structure is simple to install and is economical in manufacture and installation. Any shifting of the insulating panels resulting from temperature variations or from the weight of the liquid within the chamber 10 has essentially no effect on the holding power of the supporting structure 32 which move or shift with any movement of the insulating panels 46.

While in the foregoing there has been provided a detail description of a particular embodiment of the present invention, it is to be understood that all equivalents obvious to those having skill in the art are to be included within the scope of the invention as claimed.

I claim:

1. A chamber for storing liquid gas at cryogenic temperatures comprising in combination:
   (a) an outer support structure defining a chamber space interiorly thereof,
   (b) a plurality of insulating panel means having an inner surface and an outer surface, said insulating panel means being disposed inside of said support structure with said outer surface substantially adjacent to said outer support structure,
   (c) means for supporting said insulating panel means, said support means being adapted to positively support said insulating panel means in place against said outer support structure while "floating" with movement of said panel means as a result of expansion or contraction thereof due to changes in temperature in said chamber or weight of liquid gas including:
       (i) a rigid member having a restraining portion for engaging said insulating panel means,
       (ii) a resilient means for urging said insulating panel means against said outer support structure,
       (iii) said resilient means being disposed between and interconnecting said rigid member with said outer support structure, and
   (d) a liquid barrier disposed inwardly of said insulating panel means for restraining egress of said liquid gas contained therein and mounted in position by means engaging said insulating panel support means.

2. The chamber combination of claim 1 wherein said rigid member comprises an elongated member T-shaped in cross-section, and said resilient means comprises spring means.

3. The chamber combination of claim 2 wherein the top planar portion of said T-shaped elongated member is disposed to engage the inner surface of said insulating panel means, and said spring engages the stem of said T-shaped elongated member projecting toward said outer surface of said insulating panel means.

4. The combination of claim 1 wherein a plurality of layers of said insulating panel means are provided, said panel means being in end to end relationship, and said resilient means comprise spring means which pass both through said panel means and between the opposite ends of said panel means.

5. The combination of claim 1 wherein a plurality of layers of said insulating panel means are provided, said panel means are in end to end relationship in each of said layers, said resilient means pass both through said panel means and between the said ends, and insulating filler means substantially surround said resilient means for the entire distance between said outer support structure and said support means.

References Cited
UNITED STATES PATENTS

| | | | |
|---|---|---|---|
| 3,196,622 | 7/1965 | Smith et al. | 62—45 |
| 2,536,039 | 1/1951 | Craven | 52—513X |
| 2,865,195 | 12/1958 | Jack | 52—712X |
| 2,999,571 | 9/1961 | Huber | 52—479X |
| 3,026,577 | 3/1962 | Dosker | 52—506 |
| 3,058,551 | 10/1962 | Martin | 52—404X |
| 3,151,416 | 10/1964 | Eakin et al. | 52—169X |
| 3,378,975 | 4/1968 | Hill | 52—509X |
| 3,386,220 | 6/1968 | Staats | 52—584X |
| 3,407,606 | 10/1968 | Khan et al. | 61—.5 |
| 3,418,812 | 12/1968 | Khan et al. | 61—.5 |

ALFRED C. PERHAM, Primary Examiner

S. D. BURKE III, Assistant Examiner

U.S. Cl. X.R.

52—506, 573, 712; 61—.5